United States Patent [19]

Anderson et al.

[11] Patent Number: 5,029,174
[45] Date of Patent: Jul. 2, 1991

[54] INTERMODULATION PRODUCT STABILIZED LASER

[75] Inventors: Mark W. Anderson, Fremont; Gary W. DeBell, Los Altos; Robert J. Schultz, Union City, all of Calif.

[73] Assignee: Spectra-Physics, Inc., San Jose, Calif.

[21] Appl. No.: 446,237

[22] Filed: Dec. 5, 1989

[51] Int. Cl.$^5$ .............................................. H01S 3/137
[52] U.S. Cl. ....................................... 372/32; 372/29; 372/20
[58] Field of Search ........................ 372/32, 98, 29, 20

[56] References Cited

U.S. PATENT DOCUMENTS

| | | | |
|---|---|---|---|
| 3,243,722 | 8/1961 | Billings | 372/32 |
| 3,431,514 | 3/1969 | Oshman et al. | 372/32 |
| 3,568,088 | 3/1971 | Dessus | 372/32 |
| 3,662,279 | 10/1972 | Sandstrom et al. | 372/32 |
| 3,902,135 | 8/1975 | Terada et al. | 372/32 |
| 4,468,773 | 8/1984 | Seaton | 372/32 |
| 4,592,058 | 5/1986 | Mongeon et al. | 372/32 |
| 4,672,618 | 6/1987 | Wijntjes et al. | 372/32 |
| 4,730,323 | 3/1988 | Seaton | 372/32 |
| 4,779,279 | 10/1988 | Brown | 372/32 |

Primary Examiner—Frank Gonzalez
Assistant Examiner—Susan S. Morse
Attorney, Agent, or Firm—Thomas M. Freiburger; Donald C. Feix

[57] ABSTRACT

A method and system for stabilizing the output frequencies of a multimode laser of the type which operates in at least three optical cavity modes includes detecting the intermodulation product frequency, using a suitable photodetector. The optical cavity modes may be either purely longitudinal for a single transverse mode, or may include radiation from multiple transverse cavity excitations, also with possible longitudinal plurality. The detector output is monitored for the intermodulation product beat signal which is contained in the detector current at the differences of the primary difference frequencies of the optical modes. A signal derived from the frequency of the intermodulation product term is compared with a reference signal, and the resulting error signal is driven to zero by varying the optical length of the laser oscillator cavity in response to the error signal, thereby causing the operating modes of the laser to be stabilized. Possible means of adjusting optical cavity length include, but are not limited to, thermal expansion or contraction of the resonator support structure which is used to establish the relative spacing of the laser's end mirrors, by piezoelectric or magnetostrictive means according to which one or both cavity mirrors is moved to change physical cavity length, or other electro-optic means which may be employed to adjust optical cavity length by control of the refractive index or optical path length presented by an intracavity optical element.

28 Claims, 4 Drawing Sheets

INTERMODULATION PRODUCT STABILIZED LASER

BACKGROUND OF THE INVENTION

This invention relates to lasers having a plurality of optical cavity modes which oscillate under the gain curve, and to stabilizing the frequencies of those modes so that those frequencies do not vary appreciably with time. More particularly, the invention is concerned with the mode stabilization of lasers, particularly gas lasers, having three or more longitudinal modes, which in the absence of other qualifying language should be taken to mean that the modes share the same transverse mode indices m and n, and differ only in their longitudinal mode index q (see Equation 1 below). Multiple transverse configurations may also be treated as a simple logical extension of the longitudinal case, to which this discussion is mainly particularized for the sake of clarity and concreteness.

A number of types of lasers, particularly gas lasers, exhibit several longitudinal modes. The stabilization of a laser having three or more modes can be difficult, since these may be relatively close in frequency, and until the present invention, there was not a convenient property of the laser's output radiation which could be monitored and used in a simple way to feed back a control signal to hold the modes stable in frequency.

Lasers often exhibit a problem in which the longitudinal mode frequencies vary with time. This is caused by variations in optical cavity length, which are often thermal or acoustic in origin. Without any stabilization mechanism, such a laser will have modes whose positions drift back and forth under the gain curve, so that the output frequencies emerging from the laser will vary. This can cause problems in several respects. First, the laser may be desired for use with a particular stabilized frequency performance characteristic, as a requirement of a certain type of testing or end use. Mode stability can be important in laser Doppler velocimetry applications. Also, in cases where a laser beam is to be modulated with signal information and then demodulated at a later time, the constancy of the individual mode frequencies can be a great advantage. Secondly, if mode frequencies are allowed to vary in relation to the frequency of the natural atomic transition frequency responsible for the emission (and hence vary in relation to the gain curve of the laser medium), the total intensity of the laser will fluctuate as a result. In many uses of lasers, it is important to have a stable total output intensity. Thus, this technique also provides a measure of intensity stabilization.

The optical frequencies $f_{mnq}$ associated with the transverse electromagnetic modes $TEM_{mnq}$ which a laser resonator of optical cavity length L can support are given by $$f_{mnq} = F\{q + (1+m+n)\pi^{-1} \arccos[(1-L/b_1)(1-L/b_2)]^{\frac{1}{2}}\} \quad [\text{Eq. 1}]$$

where:
$b_1$ and $b_2$ are effective mirror radii of curvature
q is the longitudinal mode number
m and n are transverse mode numbers
F is the "free spectral range" given by $C/(2L)$
C is the speed of light
L is the optical cavity length where $$L = \sum_i n_i L_i$$

$L_i$ are physical length elements along a chief ray connecting the cavity mirrors, and
$n_i$ are the local refractive indices for each $L_i$.

The present invention is concerned with stabilization of laser frequencies to accuracies better than one half of a free spectral range as defined above.

There have been longitudinal mode stabilization systems for lasers having two modes. Two mode lasers have resonator tubes or cavities which are shorter in length than the three or more mode lasers with which the present invention is concerned. For example, in a helium-neon laser of 23.4 cm length there will be two modes under the gain curve separated by 640 megahertz (one free spectral range). In a tube with no inherent polarization mechanism (such as a Brewster window), each mode often assumes a pure linear polarization state which is orthogonal to that of the other mode, and these polarization orientations remain stable in time. This particular behavior of the modes with respect to polarization is a function of the birefringence of optics which are in the laser cavity, e.g. the mirrors.

A common method which has been used for stabilization of the mode frequencies in such a two mode laser (one with orthogonal polarizations) has been to balance the intensities of the two modes. An external polarizing beamsplitter can be used to separate the two modes based on their polarization properties. With the two modes separated according to polarization state, each mode is directed onto a detector, and the resultant signals from the two detectors are compared to assure that relative light intensities of the two modes remain constant. Any deviation from the set point can be made to generate an error signal. The error signal can be used to control a heater surrounding the tube to adjust the tube's length by changing its temperature (and hence its length via its thermal expansion). This results in the return of the modes to their original displacements from line center, thus enforcing frequency stability.

Stabilization of lasers with three or more longitudinal modes is much more troublesome. If the laser is inherently polarized (due perhaps to intracavity optics such as a Brewster plate), then the outputs at the different optical frequencies $f_{mnq}$ for several adjacent q's are no longer separable based on their simultaneously distinct and distinguishable polarization properties, as they are all the same polarization. Alternatively (as in the case for two mode lasers), multiple longitudinal mode lasers without intracavity polarizers most often will lase such that the output for a given longitudinal mode index q is linearly polarized. Furthermore the various modes for which oscillations occur, denoted by q's, will have one of two orthogonal polarizations, also as in the two mode case. It is not predictable a priori, however, which modes will have a given polarization or for that matter how many modes will exist in each of the two possible polarization states. (Usually, for a specific tube, it is found that modes for adjacent q's have orthogonal polarizations. This behavior, however, is far from universal, and is extremely prone to disruption by minor perturbations in operating conditions, including plasma tube temperature.)

Prior to the present invention it was not apparent how to stabilize a multimode laser in a simple and convenient way. It is among the objects of the present invention to address the monitoring of the frequencies of optical modes in a laser by utilizing a known property or effect which occurs when the light from a laser with three or more modes is monitored with a photodetector, and to use this information to control the laser, e.g. by adjusting the optical cavity length based on a control signal derived from monitoring this property.

SUMMARY OF THE INVENTION

In accordance with the method and system of the present invention, the output frequencies of a laser which operates in at least three longitudinal cavity modes are stabilized by monitoring the frequency of an intermodulation product term or "beat note" which is an inherent effect detectable in the output of a photodetector illuminated by all modes of the laser beam. The intermodulation product term has a beat note frequency which is relatively low, in the range of zero to a few megahertz. This frequency is held substantially fixed in accordance with the principles of the invention, thereby causing the operating modes of the laser to be stabilized at frequencies corresponding to a selected intermodulation product frequency.

The intermodulation product frequency or "beat note" frequency can be held at any selected reference value within the range of "beat note" frequencies which occur, and the effect of selecting different reference frequencies for this beat note is merely to shift the stabilized positions of the longitudinal laser modes under the gain curve, toward higher or lower frequencies. Thus, a reference beat note frequency can be selected to position the three or more laser modes at desired frequencies, with the frequency difference between adjacent modes under the gain curve remaining approximately the same.

In one example, a helium-neon laser of 38.7 cm cavity length and operating on the 633 nm transition has three strong longitudinal modes (and a marginal fourth). The frequency difference between adjacent modes is very nearly 387 megahertz, determined by the length of the laser cavity. However, this is an approximate frequency difference and a slight correction is required to define the actual frequency difference between any two immediately adjacent modes. In this example (reference FIG. 3), the frequency difference between the mode labeled as item 40 and mode 42 is 387 megahertz minus a slight correction, $\Delta_1$, and the frequency difference between mode 42 and mode 44 is 387 megahertz minus a small correction, $\Delta_2$. The two deltas are different in value in nearly all cases. The modes will generally pull toward the center frequency 46 of the gain curve 36.

When all of these signals, i.e. the laser beam with all modes, are brought together on a photodiode or other suitable photodetector, the detector outputs a signal which makes apparent not only the primary difference frequencies, (at approximately 387 megahertz) but also the difference between the difference frequencies, or "second difference" frequency. This "second difference" frequency is the difference between the two deltas. We also refer to this as a "second beat note" whose frequency is the "intermodulation product frequency."

The second "beat note" is in the low RF ranges. The actual beat frequency depends upon the instantaneous placement of longitudinal cavity modes relative to the center of the Doppler broadened gain profile. The "beat note" is found to be an accurate predictor of mode placement, and in fact the two effects are causally related.

The frequency of the second beat note will drift in an unstabilized multimode laser along with the drifting longitudinal modes. In accordance with the invention, the second beat note is monitored via the output of the photodetector and is held essentially to a fixed frequency value within the range for which the second beat note is observable. In a preferred embodiment this is accomplished by converting the observed beat note frequency to a voltage, which is compared to a reference voltage to generate an error signal. The error signal is used to drive a cavity length adjustment means, which slightly adjusts the optical spacing between the cavity mirrors in the correct direction, longer or shorter, in order to bring the second beat note frequency back to the preselected frequency, and this results in a high degree of frequency stability (e.g. better than 1 part in $10^8$) for the individual optic modes of the laser cavity.

In one embodiment the cavity length adjustment means is comprised of a heater in contact with the laser cavity tube or envelope or frame element. The heater controls the cavity by changing its temperature, and hence its length, via its thermal coefficient of expansion.

In the preferred embodiment a small amount of laser light which passes through the high reflector at the rear of the laser is used for the monitoring and control functions. Thus, laser light which would otherwise be wasted is used, although a portion of the light from the other end of the laser could be alternatively used for control, by employing a beamsplitter.

In this way, the method and system of the present invention take advantage of an effect that is inherently present in multimode lasers, and use that effect in a relatively simple arrangement to hold the frequencies of the laser's modes essentially fixed. The system is capable of holding the frequencies fixed within about 1 megahertz, which is roughly a few parts in $10^9$.

Other and further objects of the present invention will be apparent from the following description and claims and are illustrated in the accompanying drawings. By way of illustration these drawings show preferred embodiments of the present invention and the principles thereof and what are now considered to be the best means contemplated for applying these principles. Other embodiments of the invention which employ the same or equivalent principles may be used and structural changes may be made as desired by those skilled in the art without departing from the present invention and the purview of the appended claims.

DESCRIPTION OF PREFERRED EMBODIMENTS

Figure 1:
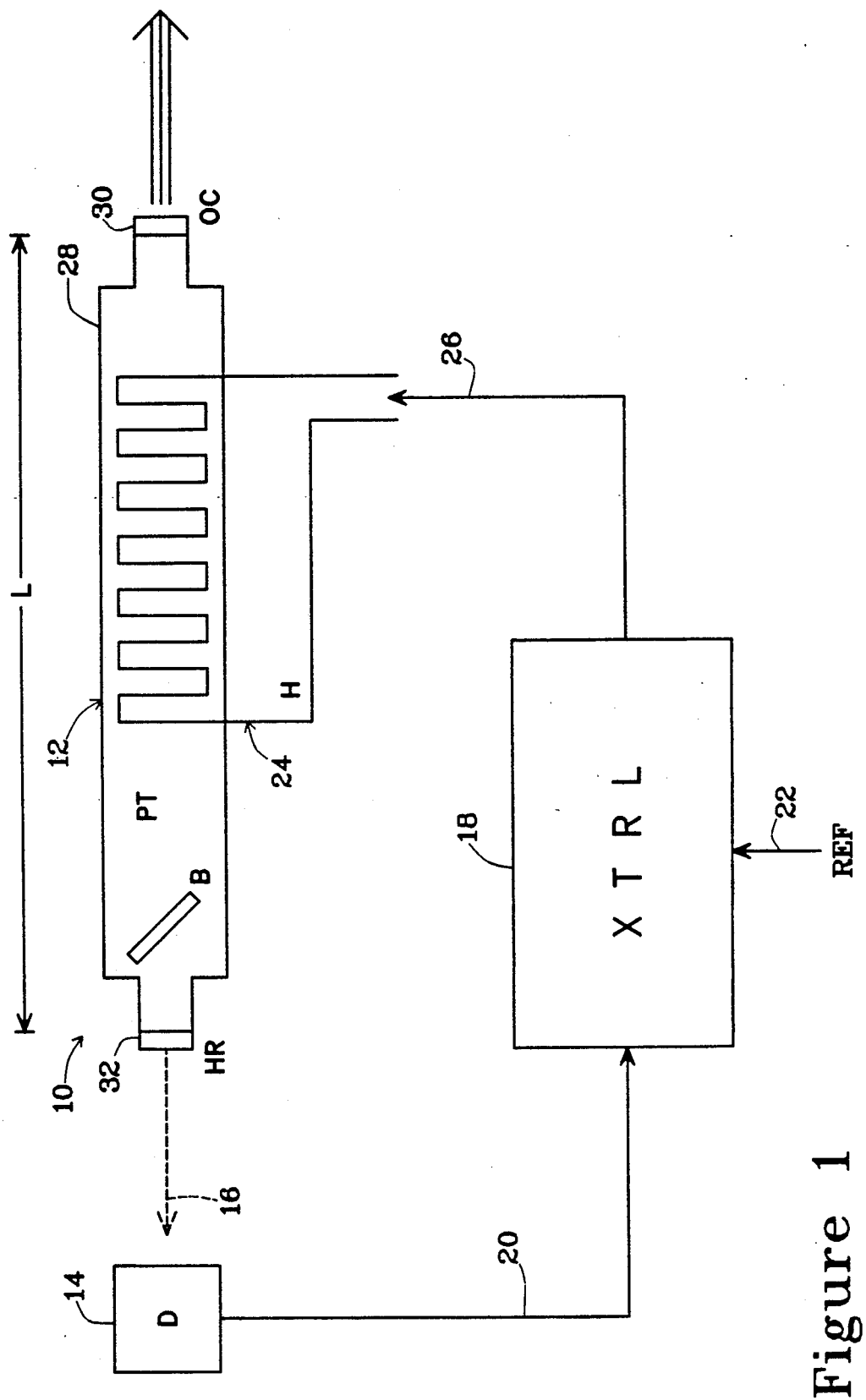
FIG. 1 is a simplified schematic overall view of an intermodulation product stabilized laser system in accordance with the invention.

In the drawings, FIG. 1 shows in a simplified schematic view the principal components and general scheme of operation of one preferred embodiment of an intermodulation product stabilized laser in accordance with the invention.

The principal components of the system 10 in accordance with this embodiment of the invention are a laser 12, a photodetector assembly 14 receiving a portion 16 of laser light from the laser 12, and a controller 18 receiving a signal 20 from the photodetector assembly. The controller compares the photodetector signal with an externally provided reference value or signal 22, and a resonator cavity adjustment means 24 responds to a signal 26 from the controller 18 to stabilize the longitudinal modes of the laser 12.

In this preferred embodiment the length of the optical cavity is temperature dependent. The optical cavity length adjustment means 24 is comprised of a heater which surrounds or is in physical contact with a plasma tube 28 of the laser 12, which may be a helium-neon laser or other gas laser. The cavity length adjustment means 24 could alternatively be some mechanical device for adjusting the separation of mirrors 30 and 32 at opposite ends of the laser plasma tube. Such a device could be a piezoelectric element which changes length in response to an applied voltage, for example. The principles of the invention can also be applied to lasers other than gas lasers.

The heater 24 acts on the plasma tube envelope or frame element 28 supporting the mirrors 30 and 32. By supplying heat or not supplying heat it controls the length of the envelope and hence the separation between mirrors via thermal expansion and contraction. A cooling element is not needed, since the system can be set up so as to require some degree of heat application to maintain the mirrors in the proper range of separation, i.e. normal operating temperature is set above ambient.

The particular laser depicted and described in conjunction with this preferred embodiment is an integral sealed mirror helium-neon laser with its electrical discharge excited by external application of a DC voltage across its electrodes (not shown), yielding over 5 milliwatts of output power emergent from the output coupler mirror 30, at a wavelength of 633 nanometers. The tube or envelope length, i.e. the length between the mirrors 30 and 32, is approximately 40 centimeters, which is sufficient to sustain simultaneous lasing action at three and sometimes four longitudinal cavity modes. These particular details may easily be generalized to other cases, and our mention of such details is not to be construed as a limitation on this invention.

The particular plasma tube 28 shown in FIG. 1 employs a Brewster plate B to enhance the intermodulation product signal inherent in the multimode operation by aligning the polarizations of the emitted modes. This yields a stronger beat note and greater tuning range (defined later) than are present in its absence.

A small amount of laser light 16 leaks through the high reflector mirror 32 and impinges on a photodetector of the photodetector assembly 14. The detector assembly 14 detects the intermodulation term, i.e. the "second difference" frequency as described above and sends an electrical signal 20 at the intermodulation product frequency to the controller 18.

The controller 18 compares the signal 20 with the externally provided reference value 22, which is preselected to correspond to a selected "beat note" frequency, to generate an error signal. The error signal, through other electronics contained in the controller 18, determines via the output signal line 26 the current passing through the heater 24 connected to the plasma tube or envelope 28. The heater is thereby used to control the tube's length in such a way as to bring the detected signal 20 into agreement with that represented by the reference value 22.

Figure 3:
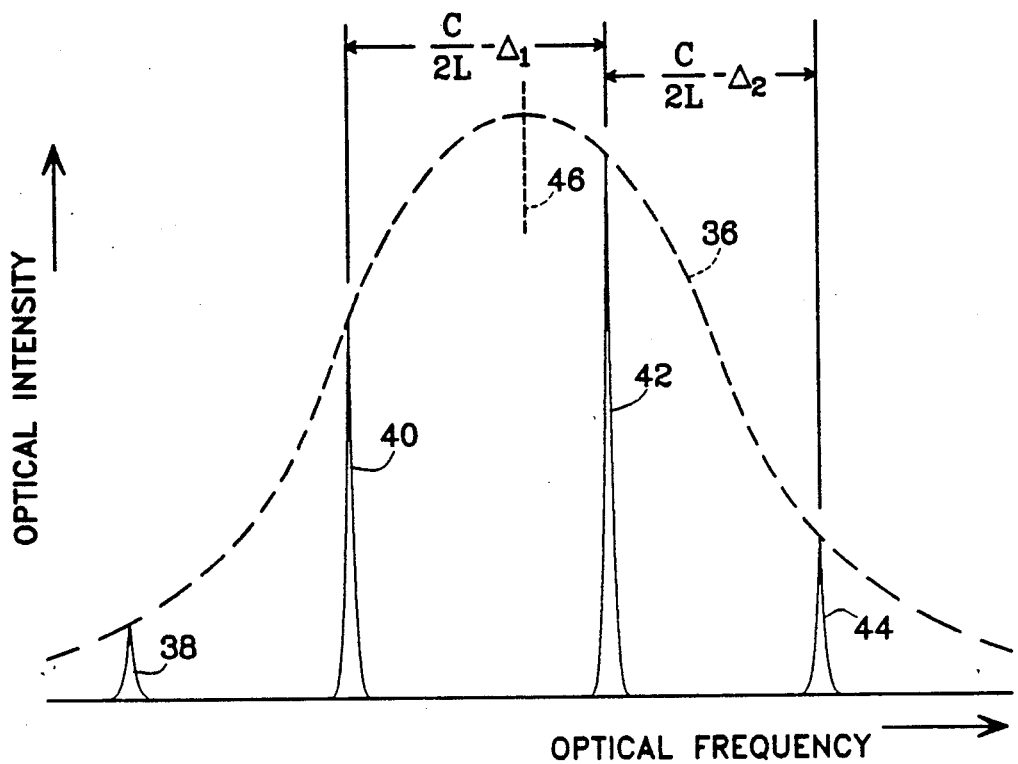
FIG. 3 is a simple graph showing the relationship of longitudinal cavity mode frequencies under a gain curve and their relative intensities.
Figure 4:
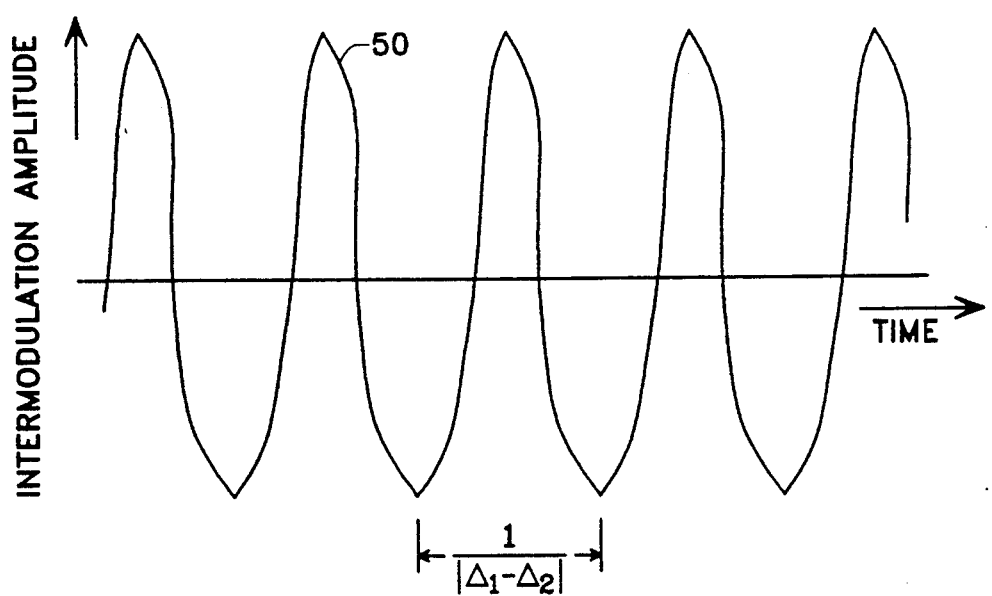
FIG. 4 is a graph plotting intermodulation product amplitude versus time, showing the intermodulation product beat note or "second beat note."

FIGS. 3 and 4 illustrate the longitudinal cavity modes of a multimode laser such as depicted in FIG. 1 and the "second difference" frequency or second "beat note" which occurs as detected by the photodetector.

A basic Fabry-Perot resonator has cavity modes separated in frequency by C/2 L, where C is the speed of light and L is the resonator's optical cavity length. Those modes which fall under the laser's gain curve 36, i.e. the modes 38, 40, 42 and 44 as shown in FIG. 3, and whose gain exceeds cavity losses, will result in laser light output. The center frequency of the gain curve for the 633 nm helium-neon transition is at approximately 473.612 terahertz (at 46 in FIG. 3). The gain profile has a width of approximately 1.4 gigahertz. Modes for a 38.7 centimeter cavity are approximately 387.6 megahertz apart. Although there may be several additional cavity modes under the gain curve at frequencies higher and lower than those shown in FIG. 3, only those modes shown are candidates for lasing, i.e. their gain exceeds cavity losses.

However, the actual separation in frequency of those modes which oscillate is not exactly the Fabry-Perot spacing, there being a slight modification or delta which depends in magnitude and sign upon the particular modes involved and their location under the gain curve. The origin of this slight correction term is due to a phenomenon known as "mode pulling" which arises from the highly dispersive dielectric constant of the gain medium for frequencies in the immediate neighborhood of the atomic transition frequency upon which the gain curve is centered. Typical values of delta for a He-Ne laser may range in magnitude to several hundred kilohertz or beyond, depending on mode placement about the line center 46.

In an unstabilized multimode laser, the frequencies of the longitudinal modes 38, 40, 42 and 44 will drift right and left under the gain curve in FIG. 3 (up and down in frequency, respectively). For example, if the tube or envelope length (the spacing between the mirrors) changes by one half wavelength due to changes in temperature, each of the modes 40, 42, etc. will shift left or right by one entire mode position under the gain curve according to whether the temperature has increased or decreased, respectively. For a tube of length 40 centimeters whose thermal expansion coefficient is $10^{-5}$ per °C., a temperature change of one °C. results in a cavity expansion of four microns. This is about six wavelengths for a helium-neon laser operating at 633 nm, thus the modes will shift about twelve positions under the gain curve per °C. since each mode represents an integer number of halfwaves between the mirrors.

FIG. 4 is a graph of the intermodulation product beat note signal output by a suitable photodetector. When the multiple modes depicted in FIG. 3 are simultaneously coincident on the photodetector, there result beat notes (or primary beat notes) at the primary difference frequencies (approximately 387 megahertz for a 38.7 cm long resonator) corresponding to the spacing between adjacent longitudinal modes. The primary difference frequencies are essentially C/2 L, but they may all be slightly different owing to their individual delta values as already discussed and illustrated in FIG. 3. These primary difference frequencies may be used for frequency control of the laser provided that one employs a sensitive enough frequency discriminator, but another technique is easier and is illustrated here. The detector photocurrent contains additional spectral components at the differences between the primary difference frequencies. These are called intermodulation product terms, or second difference frequencies, or second beat notes. The signal output from the photodetector circuitry (item 14, FIGS. 1 and 2) may be filtered to have a low-pass characteristic, and thus not exhibit significant signal content at the primary difference frequencies. Thus the output (item 20, FIG. 1) appears at the second difference frequency. This is shown as item 50 in FIG. 4.

The actual frequency of a second beat note is determined numerically by the difference of two deltas (such as $\Delta_1$ and $\Delta_2$ in FIG. 3) and is strongly dependent upon longitudinal mode placement under the gain curve. This in turn depends critically on cavity length, as demonstrated above. In practice, it is found that the intermodulation product waveform may have high harmonic content such as is illustrated by the nonsinusoidal waveform as shown in FIG. 4. The amplitude of the intermodulation product waveform as measured by a photodetector is typically a few percent of the signal which corresponds to the average output power of the laser.

FIG. 4 shows the second beat note or second difference waveform 50 and illustrates that the time period from peak-to-peak is equal to $|\Delta_1 - \Delta_2|^{-1}$. A number of crossover points occur where $\Delta_1$ and $\Delta_2$ are equal and at these crossover points there instantaneously is no beat note. The crossovers occur when the three subject modes (such as modes 40, 42 and 44 shown in FIG. 3) are symmetrically placed under the gain curve, i.e. mode 42 coincides with the center 46. There are a number of such symmetries for a multimode laser. The portion of a free spectral range over which the longitudinal optical frequencies may exist while still producing a continuously variable intermodulation product note of non-zero frequency and intensity is called the "tuning range."

By the method and system of the present invention the modes under the gain curve are held substantially fixed in place, to within one-half of a free spectral range. In practice stability sufficient to limit frequency drift to less than one megahertz is achievable. This is accomplished by holding the second difference waveform (item 50, FIG. 4) fixed at a preselected frequency, a typical value for which may be about 60 kilohertz.

As discussed above, the second difference frequency is held to such a value by sensing the second beat note at the photodetector, constantly comparing its frequency with a reference frequency, and driving the error signal toward zero by appropriately changing the optical length of the laser cavity. One method of accomplishing this is by changing the temperature of the cavity envelope or tube or frame, by use of a heating element as described above. The optical length of the resonator may also be controlled piezoelectrically or by other means.

Figure 2:
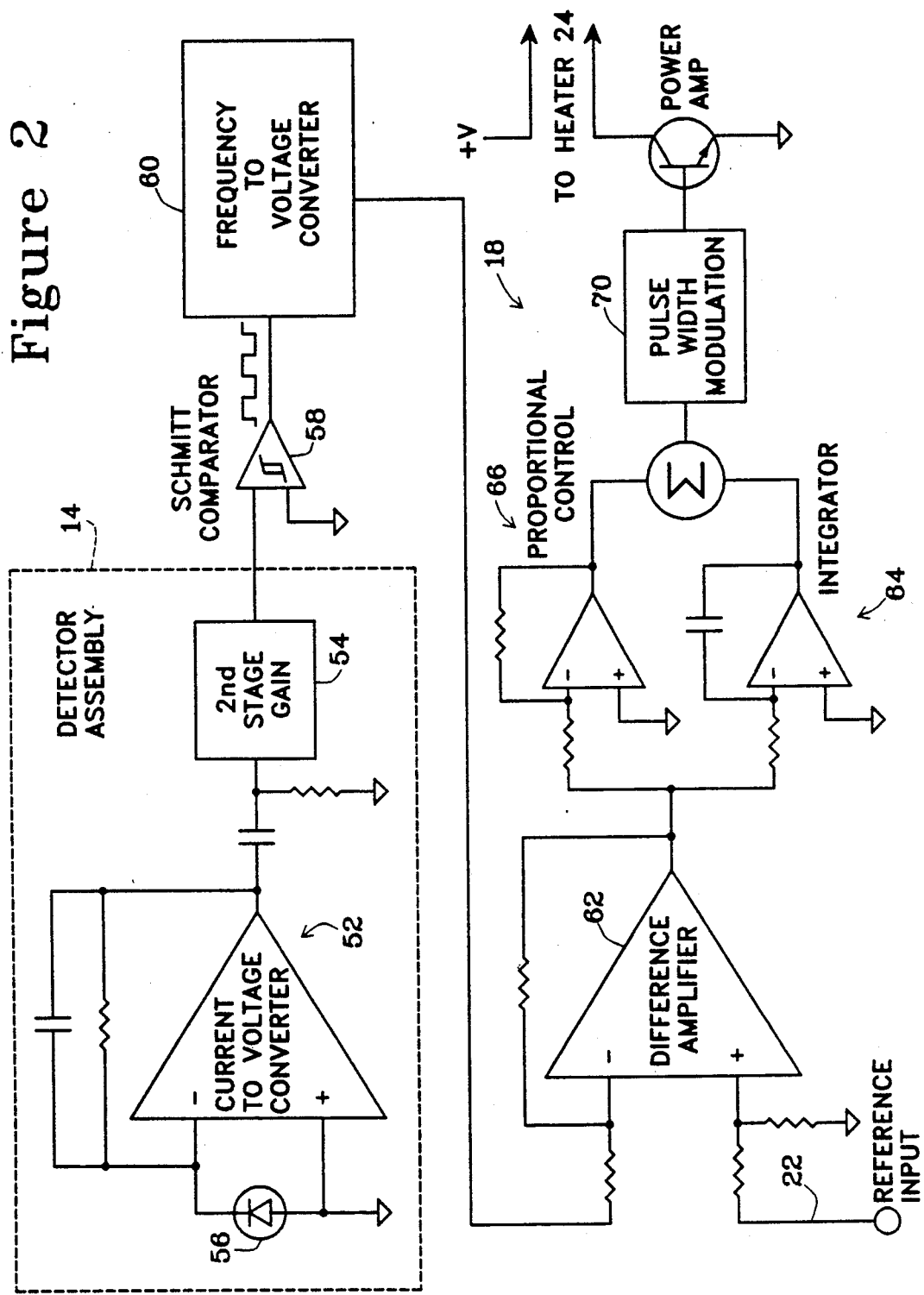
FIG. 2 is a schematic block diagram which illustrates the principal features of one possible implementation of the detection and control electronics.

FIG. 2 shows in block diagram form the detector and controller components, system and functions. A control circuit in accordance with one preferred embodiment of the invention employs a two-stage photodetector assembly 14 with AC coupling between the stages 52 and 54 to eliminate the large DC component of the detected optical signal (i.e. the average optical power).

The first stage transimpedance amplifier 52 converts photocurrent from a photodiode 56 to a voltage proportional to the incident, time varying light intensity. Its response is intentionally bandwidth limited to below a few megahertz, which is sufficient for detection of the intermodulation product beat note or "second beat note." Second stage gain 54 provides additional amplification of the intermodulation term, and also incorporates a coaxial line driver (not shown) for the cable between the detector assembly module 14 and the separate controller circuit generally identified in FIG. 2 as 18. This division of circuitry is convenient but not essential.

Zero crossings of the intermodulation product beat note are detected by a Schmitt comparator 58, which presents a rectangular pulse train to a frequency-to-voltage (F/V) converter 60. The frequency-to-voltage converter generates an output voltage proportional to the frequency of the signal applied to its input. A difference amplifier 62 of the controller 18 then subtracts from the F/V output an externally applied reference voltage 22, which functions as a set point for the F/V output and hence for the beat note frequency.

An integrator 64 which follows the difference amplifier 62 is responsible for removing drift and offset from the beat note frequency, while a proportional arm 66 handles short-term fluctuation. Together, the proportional and integral amplifiers function to drive the difference amplifier's output to zero. They do this by modifying the plasma tube's intermodulation beat frequency to make the F/V converter output agree with the reference input 22. As described above, this is accomplished in accordance with one preferred embodiment by changing the temperature of the tube or envelope in order to effect a change in the cavity length. Tube temperature is controlled by varying the average current through the heating element 24 (FIG. 1) which is wrapped around the plasma tube 28. For this specific example, the instantaneous heater current is either full on or full off, switched at a 5 kilohertz rate, with duty cycle selected by the input to a pulsewidth modulator 70.

The system could alternatively use a digital approach to stabilizing the second beat note frequency. Instead of converting the frequency to an analog voltage signal, the system could compare the frequency numerically (i.e. the number of zero crossings per unit time of the waveform 50 in FIG. 4) to a desired set point frequency, and control the heater 24 (or other cavity length adjuster) accordingly.

Figure 5:
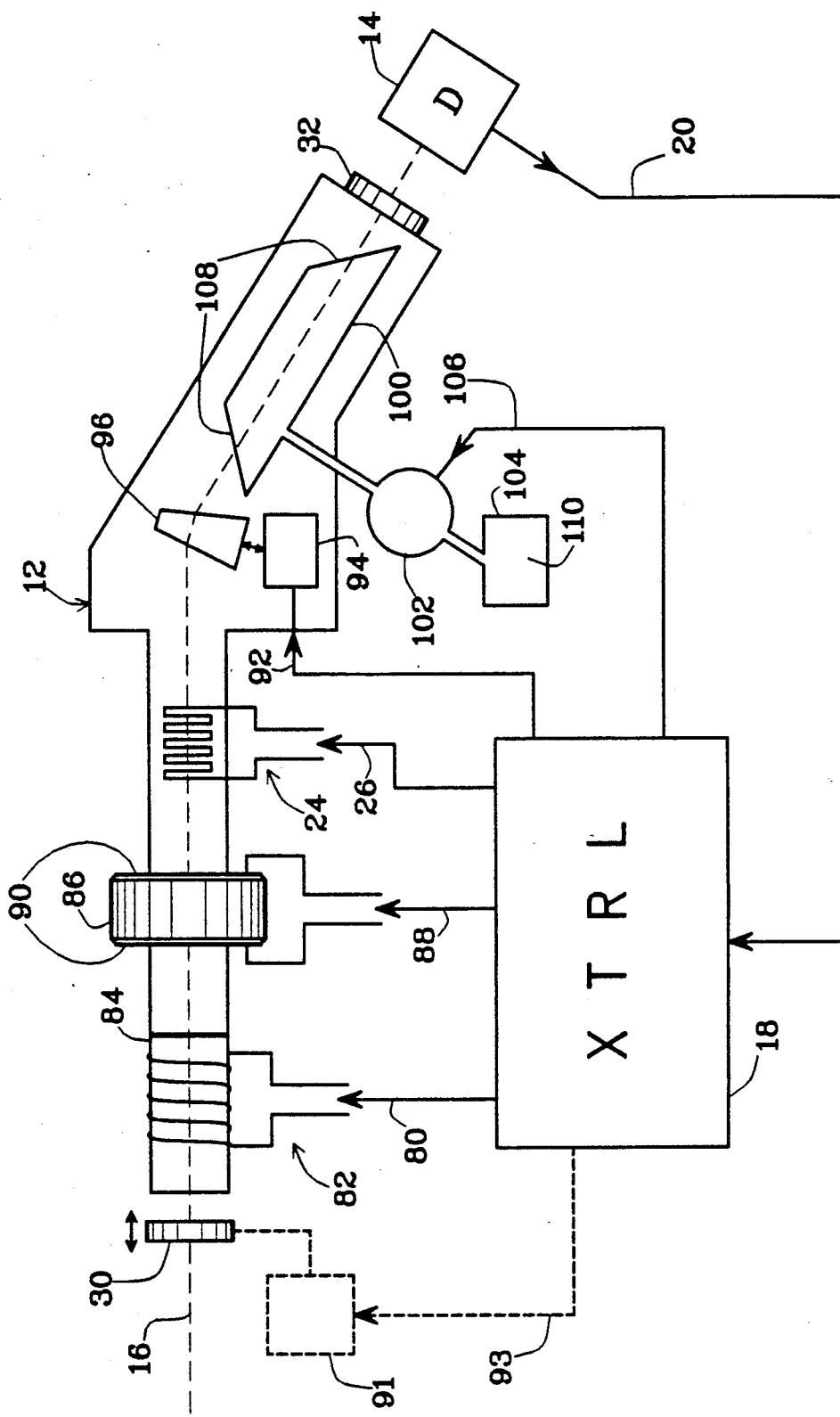
FIG. 5 is a schematic illustration which shows how a variety of devices, each exploiting a different optical effect, may be employed either individually or in combination to vary the laser's optical cavity length in a controlled way, in order to achieve active optical mode frequency stabilization.

FIG. 5 illustrates alternate means whereby optical mode frequencies may be controlled by suitable variation of physical parameters which influence the optical path length within the laser cavity bounded by the mirrors 30 and 32. Any device or combination of devices which modify the optical path length enclosed by the laser mirrors may be used as a means for stabilizing the optical mode frequencies. As previously discussed, such a device may rely upon thermal expansion and contraction of the laser cavity to increase or decrease the optical path length. The controller 18 may adjust the heater 24 by varying the electrical current 26 to obtain a desired temperature of the laser resonator structure, thereby inducing the resonator and enclosed optical cavity to assume a particular temperature-dependent optical length.

Alternately, a magnetostrictive spacer element 84 could be employed as a portion of the resonator structure 12, or could have its ends bonded internally or externally onto the resonator envelope (depending upon whether the device is internal or external to the plasma tube, respectively). The controller 18 may provide a current 80 to an electromagnet 82 that surrounds the magnetostrictive element, thereby causing its physical length to change, and hence change the mirror separation either directly (if it is integrated into the resonator) or by mechanical coercion of the envelope to which it may be bonded. In place of an electromagnet, the controller could operate a positioner or positioners which would adjust the location or orientation of permanent magnets, with the aim of modifying the magnetic field surrounding the magnetostrictive spacer element 84 in order to change its length. Of course, a combination of the two means of providing and varying a magnetic field may also be employed.

Another means of varying cavity length could employ the use of a piezoelectric spacer element 86, either bonded at its end faces to the plasma tube, or directly integrated into the resonator structure and spliced into the plasma tube envelope. In either case, the controller could provide a voltage 88 to the electrodes 90 of the piezoelectric element which would cause its length to shrink or expand, and which would then either directly or through mechanical coercion cause the length of the resonator structure to vary, thus changing the optical path length between the laser mirrors.

It would also be possible to keep one of the mirrors (say, 30) separate from the plasma envelope (using a window to seal the plasma tube), and then modulate the mirror's position directly by attaching it rigidly to an actuator 91 which would respond to signal 93 produced by the controller 18 to translate the mirror along the beam direction 16, toward or away from the opposing cavity mirror. Such a device can be magnetostrictive or piezoelectric as already discussed, or could be some other more conventional electromechanical arrangement.

The optical cavity length between the mirrors 30 and 32 can also be changed by means which vary the refractive index of an intracavity element rather than by altering the physical spacing of the mirrors (ref. Eq. 1). This is illustrated in FIG. 5 by two examples. In the first example, a Littrow prism 96 is used as a variable-thickness optical element whose position within the intracavity beam is manipulated by a positioner 94 which is in turn operated by the controller 18 through signal 92. The purpose of the positioner is to translate the wedge of the prism into the beam in order to control how much of the prism's thickness the beam must traverse. One advantage of this design is that the intracavity beam will strike the prism's entrance and exit faces at Brewster's angle, thus eliminating intracavity reflection losses and also doubling in function as a polarizing element. As a variation of this translatable prism design, one could employ a plane-parallel intracavity spacer at near-normal incidence which would then be rotatable by a suitable actuator (similar in function to 94), and which would present a variation in intracavity optical path length as a function of rotation angle. The faces of such a spacer would require high-quality antireflection coatings in order to minimize intracavity reflection losses that would degrade laser performance. Alternately, the plane-parallel spacer could be tilted at very nearly Brewster's angle to the beam direction. Small variations in rotation angle about the nominal Brewster's orientation would still provide the desired variation in optical path length, while simultaneously providing a polarizing function within the cavity.

As a second example of a variable optical path length intracavity element, consider a chamber 100 installed between the mirrors 30 and 32, with transparent end windows 108 (achieved by suitable application of antireflection coatings, or with the end windows tilted at Brewster's angle to the direction of beam propagation as shown in FIG. 5, thus achieving the same advantage for polarized operation as discussed above for the translatable Littrow prism). This chamber may be evacuated or filled by a pump 102 in response to an appropriate control signal 106 from the controller 18. A reservoir 104 of a suitable gas 110 provides the working medium which the pump is able to deliver to or remove from the intracavity chamber. By using the pump to change the pressure of the gas within this chamber, the controller is able to vary the optical index of the chamber volume in a continuous fashion, and hence vary the optical path length of the laser cavity. The use of a closed system (chamber, pump and reservoir) ensures that the intracavity chamber is not progressively contaminated by condensable vapors or particulate matter which might otherwise be pumped into the beam path from the surrounding environment. An alternative not illustrated in FIG. 5 is an optical element whose index of refraction is altered by some means other than those mentioned above.

Clearly, any of the above devices which have been described in reference to FIG. 5 can be used individually or in combination to change the optical path length of the laser cavity. Furthermore, each may be controlled singly, or in coordination with the other means present in order to achieve active stabilization of the optical mode frequencies of a multimode laser.

The discussion thus far has implicitly assumed a pure transverse mode configuration (m and n fixed integers in Eq. 1), and has addressed how one goes about stabilizing the longitudinal mode frequencies $f_{mnq}$ for that pure transverse case. While this assumption simplifies the explanation of the method (and may in fact be the most practical implementation of the invention), it is unnecessarily restrictive in scope, and we do not limit ourselves to such a restriction. All that has been said about difference frequencies and their detection applies equally well to cases of admixed transverse modes. In these cases however, the primary difference frequencies need not result from adjacent q's for the same m and n, but rather can arise for the same q with a different (m,n) specification, say (m',n'). The modes which then lase are not as evenly spaced in frequency as for the pure transverse configuration, but still the primary difference frequencies will depend weakly on mode placement under the gain curve, and consequently the second difference frequency (or frequencies) will also show this dependence. Hence these difference frequency signals (primary and secondary) will be suitable discriminators for tuning the optical mode frequencies $f_{mnq}$ by variation of laser cavity optical length, and for holding those mode frequencies stable in time by appropriate application of the control scheme already discussed.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A method of stabilizing the output frequencies of a polarized or unpolarized laser which operates in a single transverse mode configuration and more than two longitudinal modes, and in which the frequencies can shift because of variations in optical cavity length of the resonator, said method comprising,
   detecting the intermodulation product frequency of the operating modes of the laser, and
   holding that intermodulation product frequency substantially fixed, hence to cause the operating modes of the laser to be held stable at frequencies which generate as a byproduct that intermodulation product frequency.

2. The invention defined in claim 1, wherein the detection step is accomplished with a photodetector for detecting the intensity of the laser light which contains a modulation term at the intermodulation product frequency.

3. The invention defined in claim 2, wherein the intermodulation product frequency is held substantially fixed by varying the optical cavity length in response to slight spontaneous variations of the intermodulation product frequency away from a selected value which is a reference frequency.

4. The invention defined in claim 3 including the use of temperature as a means of adjusting the optical cavity length.

5. The invention defined in claim 4, including controlling the temperature of the resonator structure in response to any difference between a selected or reference value of the intermodulation product frequency and the detected intermodulation product frequency to control the resonator cavity length to cause the detected intermodulation product frequency to assume and maintain the selected value.

6. The invention defined in claim 5, wherein the cavity resonator structure temperature is controlled by a heater surrounding the cavity resonator and whose heat output is appropriately turned on or off or alternately is continuously varied or otherwise modified in response to said differences between the detected and preset intermodulation product frequencies.

7. The invention defined in claim 3, including changing a reference frequency or reference signal voltage used in a controller to represent a particular reference frequency, to cause the detected intermodulation frequency to assume a new value.

8. A method for stabilizing the longitudinal mode frequencies of a multimode laser operating in at least three longitudinal modes, the modes having a tendency to shift in frequency because of variations in optical length of the laser's resonator cavity, said method comprising,
   directing onto a photodetector a portion of the laser light containing all longitudinal modes,
   generating an output signal from the photodetector, representative of an intermodulation product term frequency or second beat note or higher order beat note frequency which is related in value to the frequencies of the longitudinal modes as the laser operates,
   comparing the signal from the photodetector with a reference value and generating a difference signal whose sign and magnitude are indicative of the deviation of the optical cavity mode frequencies away from their desired setpoint frequencies, and
   adjusting the optical path length of the laser resonator cavity in response to the difference signal, to adjust the frequencies of the longitudinal modes in the proper direction so as to drive the difference signal to zero.

9. The invention defined in claim 3, including the employment of electrically driven piezoelectric spacer elements which may be used to extend or contract the resonator structure and hence change its length in a fashion which is controllable by suitable application of a control signal or voltage.

10. The invention defined in claim 9, including controlling the voltage on a piezoelectric spacer element in response to any difference between a selected value of the intermodulation product frequency and the detected intermodulation product frequency, to cause the optical cavity length to change so that the detected intermodulation product frequency assumes and maintains the selected value.

11. The invention defined in claim 3, including the employment of magnetostrictive spacer elements which may be used to extend or contract the resonator structure and hence change its length in a fashion which is controllable by suitable application of a control signal or voltage.

12. The invention defined in claim 11, including controlling the magnetic field surrounding a magnetostrictive spacer element in response to any difference between a selected value of the intermodulation product frequency and the detected intermodulation product frequency, to cause the optical cavity length to change so that the detected intermodulation product frequency assumes and maintains the selected value.

13. The invention defined in claim 3, including the employment of a driven intracavity refractive optical element whose optical path length is dependent upon the driving influence which varies one of the refractive index and the physical orientation of the refractive optical element and which may be used to adjust the optical length of the resonator structure by adjustment of this element's optical path length upon which the entire optical cavity's optical path length depends in part; the total optical path length thus being controllable by suitable application of a driving influence which is exerted in response to a control signal.

14. The invention defined in claim 13, including controlling the influence function which drives the variable optical path length intracavity refractive optical element in response to any difference between a selected value of the intermodulation product frequency and the detected intermodulation product frequency, to cause the optical cavity length to change so that the detected intermodulation product frequency assumes and maintains the selected value.

15. A method of stabilizing the output frequencies of a polarized or unpolarized laser which operates in more than one transverse mode configuration and with a total of at least three optical modes, and in which the frequencies can shift because of variations in optical cavity length of the resonator, said method comprising, detecting the intermodulation product frequency of the operating modes of the laser, and holding that intermodulation product frequency substantially fixed, hence to cause the operating modes of the laser to be held stable at frequencies which generate as a byproduct that intermodulation product frequency.

16. The invention defined in claim 15, wherein the detection step is accomplished with a photodetector for detecting the intensity of the laser light which contains a modulation term at the intermodulation product frequency.

17. The invention defined in claim 16, wherein the intermodulation product frequency is held substantially fixed by varying the optical cavity length in response to slight spontaneous variations of the intermodulation product frequency away from a selected value which is a reference frequency.

18. The invention defined in claim 17 including the use of temperature as a means of adjusting the optical cavity length.

19. The invention defined in claim 18, including controlling the temperature of the resonator structure in response to any difference between a selected or reference value of the intermodulation product frequency and the detected intermodulation product frequency to control the resonator cavity length to cause the detected intermodulation product frequency to assume and maintain the selected value.

20. The invention defined in claim 19, wherein the cavity resonator structure temperature is controlled by a heater surrounding the cavity resonator and whose heat output is appropriately turned on or off or alternately is continuously varied or otherwise modified in response to said differences between the detected and preset intermodulation product frequencies.

21. The invention defined in claim 17, including changing a reference frequency or reference signal voltage used in a controller to represent a particular reference frequency, to cause the detected intermodulation frequency to assume a new value.

22. A method for stabilizing the optical output frequencies of a multimode laser operating in at least three optical modes, at least two of which correspond to different transverse mode configurations, the modes having a tendency to shift in frequency because of variations in optical length of the laser's resonator cavity, said method comprising, directing onto a photodetector a portion of the laser light containing all said optical modes, generating an output signal from the photodetector, representative of an intermodulation product term frequency or second beat note or higher order beat note frequency which is related in value to the frequencies of the said optical modes as the laser operates, comparing the signal from the photodetector with a reference value and generating a difference signal whose sign and magnitude are indicative of the deviation of the optical cavity mode frequencies away from their desired setpoint frequencies, and adjusting the optical path length of the laser resonator cavity in response to the difference signal, to adjust the frequencies of the said optical modes in the proper direction so as to drive the difference signal to zero.

23. The invention defined in claim 17, including the employment of electrically driven piezoelectric spacer elements which may be used to extend or contract the resonator structure and hence change its length in a fashion which is controllable by suitable application of a control signal or voltage.

24. The invention defined in claim 23, including controlling the voltage on a piezoelectric spacer element in response to any difference between a selected value of the intermodulation product frequency and the detected intermodulation product frequency, to cause the optical cavity length to change so that the detected intermodulation product frequency assumes and maintains the selected value.

25. The invention defined in claim 17, including the employment of magnetostrictive spacer elements which may be used to extend or contract the resonator structure and hence change its length in a fashion which is controllable by suitable application of a control signal or voltage.

26. The invention defined in claim 25, including controlling the magnetic field surrounding a magnetostrictive spacer element in response to any difference between a selected value of the intermodulation product frequency and the detected intermodulation product frequency, to cause the optical cavity length to change so that the detected intermodulation product frequency assumes and maintains the selected value.

27. The invention defined in claim 17, including the employment of a driven intracavity refractive optical element whose optical path length is dependent upon the driving influence which varies one of the refractive index and the physical orientation of the refractive optical element and which may be used to adjust the optical length of the resonator structure by adjustment of this element's optical path length upon which the entire optical cavity's optical path length depends in part; the total optical path length thus being controllable by suitable application of a driving influence which is exerted in response to a control signal.

28. The invention defined in claim 27, including controlling the influence function which drives the variable optical path length intracavity refractive optical element in response to any difference between a selected value of the intermodulation product frequency and the detected intermodulation product frequency, to cause the optical cavity length to change so that the detected intermodulation product frequency assumes and maintains the selected value.

* * * * *